Figure 1:
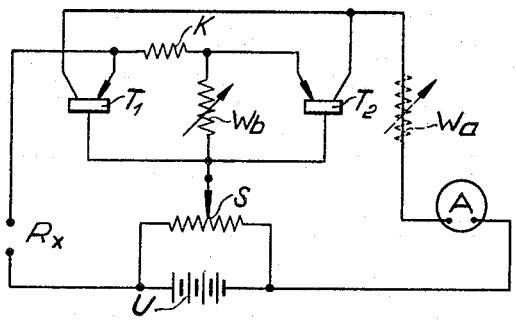

INVENTOR
Rudi Farenkopf
By: Dicke & Craig
ATTORNEY

United States Patent Office 3,331,020
Patented July 11, 1967

---

3,331,020
MOISTURE DETECTING APPARATUS INCLUDING A BIAS CONTROL FOR SEPARATELY CONTROLLING THE BIAS APPLIED TO THE BASES OF AT LEAST ONE TRANSISTOR RELATIVE TO ANOTHER
Rudi Farenkopf, Renningen, Wurttemberg, Germany, assignor to K. P. Mundinger G.m.b.H., Renningen, Wurttemberg, Germany
Filed Dec. 27, 1962, Ser. No. 247,623
9 Claims. (Cl. 324—65)

The present invention relates to a moisture meter for measuring the moisture content of different materials or articles.

Similar moisture meters according to the prior art are generally provided with amplifiers which require electron tubes and are therefore not only of a considerable size and weight but are also very delicate and fragile and susceptible to trouble. They are easily damaged when handled too roughly and then fail to operate, especially when used for carrying out measurements outside of a building or in storage sheds, for example, when used for measuring the moisture content of lumber, grain, or the like.

It is the principal object of the present invention to provide a moisture meter which overcomes the above-mentioned disadvantages. For attaining this object, the moisture meter according to the invention which is especially intended for determining the moisture content of solid materials by measuring the electrical resistance thereof by means of electrodes which are applied upon or inserted into the material to be measured is provided with a transistor which is connected between the measuring electrodes and the indicating instrument and operates as an amplifier. In order to eleminate the effects of variations in voltage and temperature, the apparatus according to the invention employs two transistors which are connected symmetrically in opposition to each other or at least two transistors which are connected in series.

While an amplifying circuit employing electron tubes always requires a relatively high filament power and therefore batteries of a considerable size and weight which render such a portable apparatus very heavy, bulky, and hard to manipulate, this disadvantage is overcome according to the invention since the transistors employed therein require hardly any power. The voltage required for the operation of the transistors may be supplied by a small long-lasting battery and the measuring instrument may therefore be of a small size, light weight, easy to manipulate, relatively shock-proof, and not susceptible to trouble and breakdowns.

Detailed tests have also revealed that the logarithmic dependency of the resistance upon the moisture content of the particular material or article to be measured can be adapted without difficulty to the exponential characteristic of the transistors. The indicating instrument of the measuring apparatus according to the invention may therefore be provided with a practically linear indicating scale which may extend, for example, from about 40 k$\Omega$ to about 100 M$\Omega$. Furthermore, this apparatus indicates the moisture content within a wide range independently of variations in voltage or temperature as well as quickly, reliably, and accurately. It may also be employed for many different purposes especially since its function and operation of determining the moisture content of a material or article is entirely independent of the type and nature of such a material or article. This is due to the fact that, because of the unique characteristics of transistors insofar as their amplifying effects may be varied by different circuit connections and different connections of their electrodes, it is possible to adapt the measuring circuit to many different requirements which may occur in actual practice. In order to comply with the particular requirements upon the measuring procedure and the sensitivity of the indicating instrument of the apparatus in measuring the moisture content of different articles or materials, it is possible to vary the individual elements of the apparatus by selecting the type and size most suitable for the particular measurement.

Figure 2:
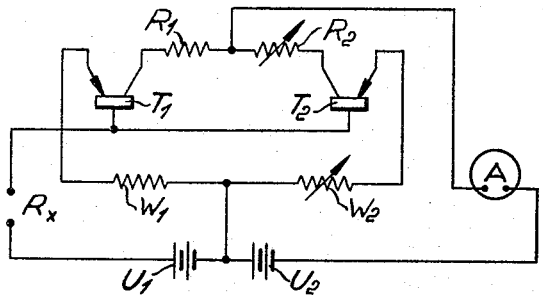
Figure 3:
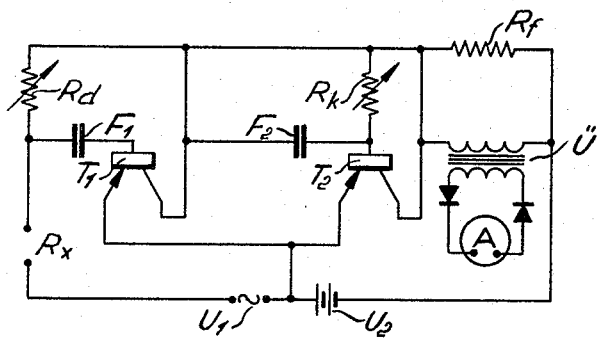

The features and advantages of the present invention will become more clearly apparent from the following detailed description thereof which is to be read with reference to the accompanying drawings, in which FIGURES 1 to 3 show three different circuit diagrams of a measuring apparatus employing a transistor amplifier according to the invention.

In the drawings, FIG. 1 and FIG. 2 each show a circuit in which two transistors are connected symmetrically in opposition to each other, while FIGURE 3 shows a circuit in which two transistors are connected in series. Of course, these circuits are to be regarded merely as examples of the manner in which the invention may be applied inasmuch as many other suitable circuits including those with more than two transistors may be devised without departing from the scope of the invention.

In the circuit of the apparatus as illustrated in FIGURE 1, a source of current U which may consist, for example, of a dry-cell battery, is bridged by an adjustable potentiometer S. The resistance $R_x$ to be measured is connected at one side to the current source U and at the other side to the emitters of the two transistors $T_1$ and $T_2$ between which, if desired, coupling resistances K may be connected. The base of each transistor $T_1$ and $T_2$ is connected to the potentiometer S which bridges the current source U and is also connected through a variable balancing resistor $W_b$ to the emitter circuit. The two collectors of the transistors $T_1$ and $T_2$ are likewise connected to each other and also to the indicating instrument A which, in turn, is connected in the usual manner to the current source U. If required, a variable compensating resistor $W_a$ may also be inserted into the output circuit for attaining the most suitable scale adjustment.

The transistors which so far have been found to be the most suitable for the apparatus according to the invention are junction transistors of the npn-type since they may withstand a higher load and therefore permit a higher amplification and also have a very low input resistance as compared with transistors of the pnp-type. By connecting the two transistors $T_1$ and $T_2$ in opposition to each other, it is also possible to compensate for variations in voltage and temperature to which transistors are usually very susceptible, so that the high indicating accuracy of the apparatus will always remain constant. By means of the resistor $W_b$ it is possible to determine the most suitable working point of the transistors, while the potentiometer S permits the input potentials on the emitters to be properly adjusted with respect to the output potentials on the collectors.

FIGURE 2 illustrates a circuit similar to that according to FIGURE 1, in which in place of a potentiometer two small current sources $U_1$ and $U_2$ are provided which are connected in series. The resistance $R_x$ to be measured is connected at one side to the current source $U_1$ and at the other side to the bases of the two transistors $T_1$ and $T_2$ rather than to the emitters as in the circuit according to FIGURE 1.

The emitters of the two transistors $T_1$ and $T_2$ are connected in parallel to the point of connection between the two current sources $U_1$ and $U_2$, and, if desired, fixed or variable resistors $W_1$ and $W_2$ may be inserted into this circuit. The collectors of the two transistors $T_1$ and $T_2$ are preferably connected in parallel through balancing resistors $R_1$ and $R_2$ to the indicating instrument A which is also connected in the usual manner to the current source $U_2$. A moisture meter with a circuit according to FIGURE 2 has the same advantages as one with a circuit according to FIGURE 1. Of course, the apparatus is designed so as to permit the different resistors to be easily adjusted or exchanged in accordance with the size required for the particular measurements to be carried out.

FIGURE 3 illustrates a further transistor circuit according to the invention, in which a source of alternating current is employed in place of a direct-current source and in which the two transistors $T_1$ and $T_2$ are connected in series and produce a multistage amplification. The alternating current may be produced in any suitable manner, for example, by a small generator or by an oscillator or a transistorized direct-current converter. One pole of the second current source $U_2$ consisting of a small battery is connected in the usual manner to the alternating-current source $U_1'$. The resistance $R_x$ to be measured is connected to this alternating-current source $U_1'$ and also through a condenser $F_1$ to the base of the transistor $T_1$. In front of the condenser $F_1$, a connecting line branches off to the collector of the transistor $T_1$ and into this connecting line a fixed or variable damping resistor $R_d$ is inserted. The emitter of the transistor $T_1$ is further connected to the emitter of the second transistor $T_2$ and the emitter of both transistors are connected to the connecting point between the two current sources $U_1'$ and $U_2$.

The collector of the transistor $T_1$ is further connected through a coupling condenser $F_2$ and parallel thereto through a variable coupling resistor $R_k$ to the base of the transistor $T_2$. In parallel connection to the latter there are also a resistor $R_f$ and a transformer U, both of which are connected at one side to the current source $U_2$. By means of the transformer U the measuring current is transmitted in the usual manner to the indicating instrument through a pair of rectifiers. This circuit arrangement also permits high resistances or the corresponding conductances as occur in moisture and insulation measurements to be measured and indicated very quickly, accurately, and reliably.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A measuring instrument for indicating the moisture content of solid materials by measuring the electric resistance thereof by means of measuring electrodes applied upon or inserted into the material, comprising a measuring circuit, an indicating instrument, a current source coupled to said measuring circuit and said indicating instrument, said measuring circuit including at least two transistors interconnected to operate as amplifiers and connected between said measuring electrodes and said indicating instrument, means for coupling said measuring electrodes across the base-emitter of at least one of said transistors, and variable impedance means operatively interconnected between said transistors for separately controlling the bias applied to the base of at least one transistor relative to the other for adjusting current flow through one of the transistors relative to current flow through the remaining transistor to compensate for variations in temperature and supply voltage whereby an accurate linear measurement of moisture content is obtained over a relatively large measuring range.

2. A measuring instrument as defined in claim 1, in which said two transistors are connected symmetrically in parallel circuit relationship in opposition to each other.

3. A measuring instrument as defined in claim 1, in which said transistors are connected in series circuit relationship relative to each other in a cascade connection.

4. A measuring instrument as defined in claim 1, in which said transistors are of the npn-type.

5. A measuring instrument as defined in claim 1, further comprising means for connecting the resistance to be measured at one side to said current source and at the other side in parallel to the emitters of said two transistors, a balancing resistor, means for connecting the emitters of said transistors through said balancing resistor to the bases of said transistors, a variable potentiometer, means for connecting said transistors through said potentiometer to said current source, means for connecting the collectors of said transistors to each other, and means for connecting said collectors to said indicating instrument.

6. A measuring instrument as defined in claim 5, further comprising a line connecting the emitters of said two transistors to each other, at least one coupling resistor inserted into said connecting line, a compensating resistor, and means for connecting said compensating resistor between the collectors of said transistors and said indicating instrument.

7. A measuring instrument as defined in claim 1, further comprising means for connecting the resistance to be measured at one side to said current source and at the other side to the bases of said two transistors which are connected in parallel, a second current source, a line connecting one side of said second current source to one side of said first current source, means for connecting the emitters of said transistors to said current-source connecting line, lines connecting the collectors of said transistors in parallel to said indicating instrument.

8. A measuring instrument as defined in claim 7, further comprising a line connecting the emitters of said two transistors to each other, compensating resistors connected into said emitter connecting line, and balancing resistors connected into said collector connecting line.

9. A measuring instrument as defined in claim 1, in which said current source comprises a first direct current source and a second alternating current source, each connected at one side to the other, and wherein the measuring instrument further comprises a first and a second condenser, a damping resistor, a coupling resistor, a further resistor, a transformer, a resetting resistance means for connecting the resistance to be measured at one side to said alternating current source and at the other side in parallel through said first condenser to the base of the first of said transistors and through said damping resistor to the collector of said first transistor, means for connecting the emitters of said two transistors to each other and also to both of said current sources, means for connecting the base of the second transistor through said coupling resistor and said second condenser in parallel with said coupling resistor to the collector of said first transistor, means for connecting the collectors of the first and second transistors through said further resistor and through said transformer to said second current source, said transformer lying parallel to said resetting resistance, and rectifying means connecting said transformer to said indicating instrument.

(References on following page)

References Cited

UNITED STATES PATENTS

| | | | |
|---|---|---|---|
| 2,531,145 | 11/1950 | Marco et al. | 324—62 |
| 2,762,870 | 9/1956 | Sziklai et al. | 330—13 |
| 2,819,352 | 1/1958 | Houck | 330—13 |
| 2,984,784 | 5/1961 | Mead | 324—65 |
| 3,086,170 | 4/1963 | Kemelhor et al. | 324—62 |
| 3,195,018 | 7/1965 | Giger | 330—12 |
| 3,197,697 | 7/1965 | McCauley | 324—62 |

FOREIGN PATENTS 900,194  7/1962  Great Britain.

WALTER L. CARLSON, *Primary Examiner.*

W. H. BUCKLER, E. E. KUBASIEWICZ,
*Assistant Examiners.*